(12) United States Patent
Agrawal et al.

(10) Patent No.: US 7,739,295 B1
(45) Date of Patent: Jun. 15, 2010

(54) METHOD AND SYSTEM FOR IDENTIFYING INFORMATION RELEVANT TO CONTENT

(75) Inventors: Ashish Agrawal, Seattle, WA (US); Robert Frederick, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 538 days.

(21) Appl. No.: 10/601,013

(22) Filed: Jun. 20, 2003

(51) Int. Cl.
*G06F 17/30* (2006.01)
*G06F 15/16* (2006.01)

(52) U.S. Cl. .................................. 707/768; 709/202

(58) Field of Classification Search .............. 707/1–10, 707/100–104.1, 200–205, 999; 705/26–27
See application file for complete search history.

(56) References Cited

U.S. PATENT DOCUMENTS

| | | | | |
|---|---|---|---|---|
| 6,006,225 | A * | 12/1999 | Bowman et al. | 707/5 |
| 6,029,141 | A * | 2/2000 | Bezos et al. | 705/27 |
| 6,185,558 | B1 | 2/2001 | Bowman et al. | |
| 6,401,085 | B1 * | 6/2002 | Gershman et al. | 707/4 |
| 6,460,036 | B1 * | 10/2002 | Herz | 707/10 |
| 6,606,644 | B1 | 8/2003 | Ford et al. | |
| 6,732,088 | B1 * | 5/2004 | Glance | 707/3 |
| 6,876,997 | B1 * | 4/2005 | Rorex et al. | 707/3 |
| 6,934,702 | B2 * | 8/2005 | Faybishenko et al. | 707/3 |
| 6,963,867 | B2 * | 11/2005 | Ford et al. | 707/3 |
| 6,983,272 | B2 * | 1/2006 | Davis et al. | 707/3 |
| 7,062,561 | B1 * | 6/2006 | Reisman | 709/227 |
| 7,295,995 | B1 * | 11/2007 | York et al. | 705/26 |
| 7,395,259 | B2 * | 7/2008 | Bailey et al. | 707/3 |
| 2002/0072972 | A1 | 6/2002 | DeBusk et al. | |
| 2002/0083119 | A1 | 6/2002 | Matsui et al. | |
| 2003/0028441 | A1 * | 2/2003 | Barsness et al. | 705/26 |
| 2003/0050924 | A1 * | 3/2003 | Faybishenko et al. | 707/3 |
| 2003/0195877 | A1 * | 10/2003 | Ford et al. | 707/3 |
| 2004/0030741 | A1 * | 2/2004 | Wolton et al. | 709/202 |
| 2004/0225647 | A1 * | 11/2004 | Connelly et al. | 707/3 |
| 2005/0125504 | A1 | 6/2005 | Leeds | |
| 2006/0173702 | A1 | 8/2006 | Saxena et al. | |

OTHER PUBLICATIONS

Xreferplus: hashing and B-Tree, 2 pages, downloaded from www.xreferplus.com on Jan. 5, 2006.*
Overture—Content Match, Get More Targeted Leads with Content Match™ (2 pages) http://www.content.overture.com/d/Usm/ac/ba/cm.jhtml [Accessed Jul. 2, 2003].

(Continued)

*Primary Examiner*—Isaac M Woo
*Assistant Examiner*—Navneet K Ahluwalia
(74) *Attorney, Agent, or Firm*—Townsend and Townsend and Crew LLP

(57) ABSTRACT

A method and system for identifying information to be associated with content of a display page. The system provides a web service through which associates of a vendor can request and receive information such as product data to be displayed on the associate's display pages. The system may receive from an associate's computer a request for product data that may include content derived from a web page on which the product is to be displayed. Upon receiving the request, the system identifies a query based on popularity of the query among users, executes the query, and provides an associate with information relating to the results of the executed query.

50 Claims, 8 Drawing Sheets

OTHER PUBLICATIONS

Morrissey, Brian, "Google Rolls Out Targeted Ads," Feb. 27, 2003 (2 pages) http://www.internetnews.com/IAR/print.php/1730811 [Accessed Jul. 2, 2003].

Morrissey, Brian, "Overture Readies New Search Products," May 9, 2003 (2 pages) http://www.internetnews.com/IAR/print.php/2203901 [Accesed Jul. 2, 2003].

"Overture Unveils New Ad Product, Content Match to Compete with Google Service," Jul. 1, 2003 (1 page) http://editorandpublisher.printthis.clickability.com/pt/cpt?action=cpt&expire=8,urlID=6797754&fb=Y&pa [Accessed Jul. 2, 2003].

U.S. Appl. No. 10/279,088 filed on Oct. 23, 2002 (Applicant Siegel).

* cited by examiner

METHOD AND SYSTEM FOR IDENTIFYING INFORMATION RELEVANT TO CONTENT

TECHNICAL FIELD

The described technology relates to identifying product data for display on a display page.

BACKGROUND

The Internet is increasingly being used to conduct "electronic commerce." The Internet comprises a vast number of computers and computer networks that are interconnected through communications links that facilitate electronic communications between vendors and purchasers. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. The WWW portion of the Internet is especially conducive to conducting electronic commerce. Many web servers have been developed through which vendors can advertise and sell products. The products can include items (e.g., music) that are delivered electronically to the purchaser over the Internet and items (e.g., books) that are delivered through conventional distribution channels (e.g., a common carrier).

Although the use of the WWW is expanding rapidly because it facilitates the buying and selling of goods through electronic commerce, the WWW also makes easily accessible vast amounts of information that are not directly related to electronic commerce. For example, a public library may make its catalog of books available through the WWW. A person can browse through the catalog to identify available books on a certain topic. As another example, various news organizations are publishing their news articles on the WWW. These news organizations may or may not charge a fee for accessing their news articles. Whether or not a fee is charged, the news organizations may derive revenue from advertisements provided when a news article is accessed. The providers of such web sites typically want to maximize their advertising revenues.

To help web sites maximize their advertising revenues, an Internet-based referral system has been developed that enables individuals and other business entities ("associates") to market products, in return for a commission, that are sold from a vendor's web site. Such systems may include automated registration software that runs on the vendor's web site to allow entities to register as associates. Following registration, the associate sets up a web site (or other information dissemination system) to distribute hypertext catalog documents that include marketing information (product reviews, recommendations, etc.) about selected products (e.g., goods or services) of the vendor. In association with each such product, the catalog document includes a hypertext "referral link" that allows a user ("customer") to link to the vendor's web site and purchase the product. When a customer selects a referral link, the customer's computer transmits the unique identifiers of the selected product and of the associate to the vendor's web site, allowing the vendor to identify the product and the referring associate. If the customer subsequently purchases the product from the vendor's web site, a commission may be automatically credited to an account of the referring associate. One such referral system is described in U.S. Pat. No. 6,029,141, entitled "Internet-Based Customer Referral System."

An associate may receive new catalog documents on a periodic basis or on an as-requested basis. After receiving the new catalog documents, the associate can identify the products that it wants to advertise and can add the information to its web pages. The associate would like to identify those products that would maximize its revenue based on the subject of the web page. In certain situations, it may, however, be difficult to identify such products. For example, a news organization may be constantly adding articles to its web site. It would be cumbersome and timeconsuming for the news organization to go through the process of selecting products for each article that will maximize its revenue. As a result, the news organization may select products in a random manner, which may not maximize the revenue. Even if content of an associate's web site is essentially static (e.g., an electronic encyclopedia), a product that may maximize revenues one day may not do so the next day. For example, if a web page contains an article about dieting, the associate may decide to advertise a book for a certain diet plan. If, however, a study is released that touts the benefits of a new diet plan, then many people may want to immediately purchase a book relating to the new diet plan. If the associate could immediately start advertising the book for the new diet plan, rather than continuing to advertise the other book, its revenues would increase.

DETAILED DESCRIPTION

Figure 1:
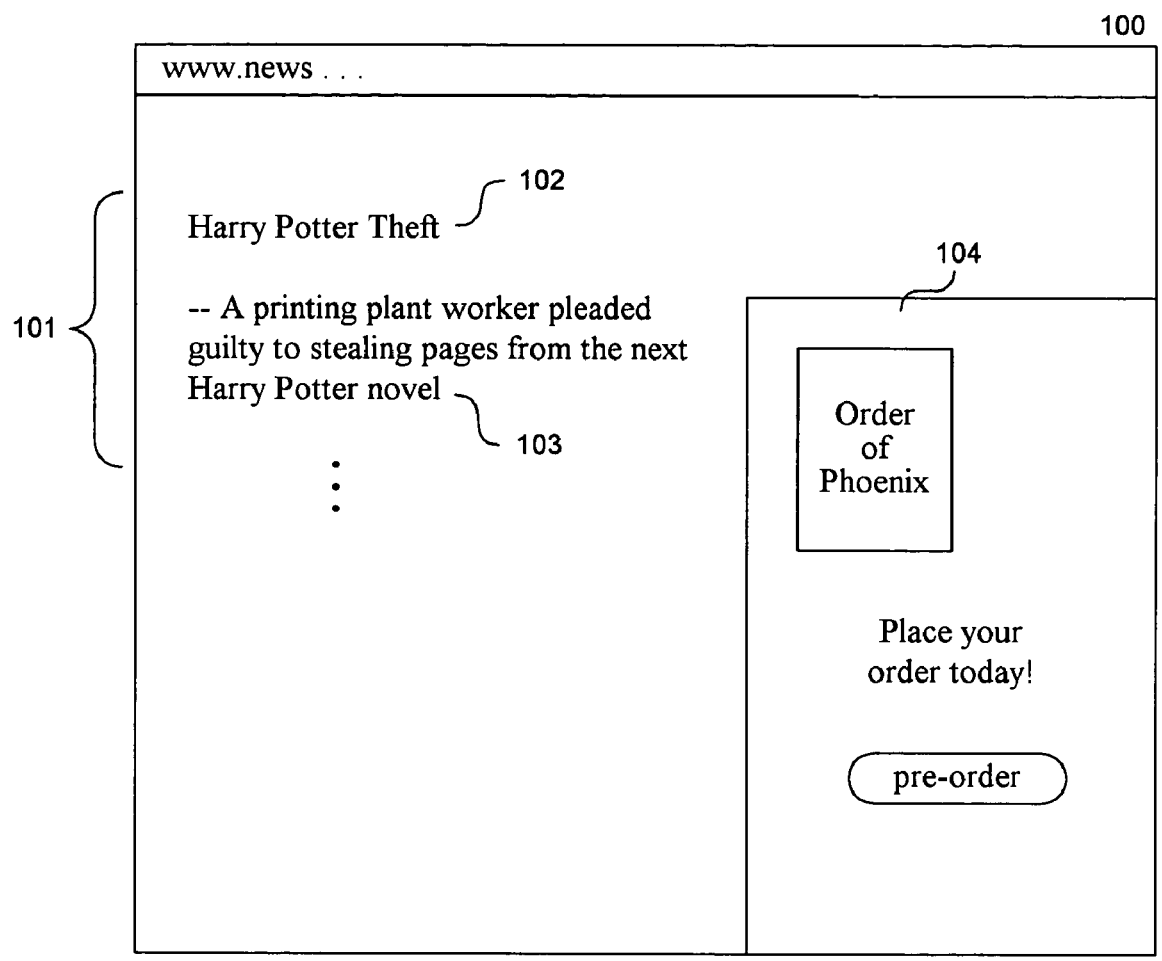
FIG. 1 is a display page illustrating an article of a news organization along with an appropriate advertisement in one embodiment.

A method and system for identifying information to be associated with content is provided. In one embodiment, the system provides a web service through which requestors (e.g., associates of a vendor) can request and receive product data (such as information and advertisements for goods or services) to be displayed on the requestor's display pages (e.g., web pages). The system may receive from a requestor's computer a request for product data that may include content derived from a web page on which the product data is to be displayed. For example, when the web page contains a news article, the content may be the headline, the first paragraph of the news article, or the entire news article. Upon receiving the request, the system identifies an "appropriate" query. The system may evaluate the appropriateness of a query based on relatedness of the query to the content and on popularity of the query among users. The system then executes the query to identify the products (e.g., goods or services) that match the query. The system then provides the requester with product data for one or more of the products. The requestor can then include the product data on the web page and, if the requestor is an associate of the vendor, it can derive revenue when a user purchases a product based on the product data.

The system may identify an appropriate query based on the popularity of queries submitted by users of the vendor's web site. The system may maintain a list of queries that have been submitted by users of the vendor's web site along with an indication of the popularity of each query. For example, users of a web site that sells books may submit queries relating to recently released and widely publicized books, relating to the current political situation in a certain country, relating to an upcoming anniversary of an historical event, and so on. The system may update the list (e.g., add new queries or update the popularity of a query) dynamically to reflect recent queries submitted by users. Alternatively, the list may be updated on a periodic basis (e.g., weekly). By selecting queries based on popularity, the system can help ensure that the products identified as a result of the query are of interest to current users.

The system may additionally use experience-based relevance techniques to assist in the selection of a product that matches the query. For example, the products that match a query may be provided to the requestor in a relevance order determined on the basis of on how well words in the description of the product match words in the query. Alternatively, the products that match a query may be provided to the requester in an order that maximizes the likelihood that the product will be purchased. If, for example, 80% of the users who submitted the query purchased the third product on a list and only 5% of the users who submitted the query purchased the first two products on the list, then the experience-based relevance technique helps ensure that the data for the third product is provided to the requestor rather than for either of the first two products. In this way, requesters can dynamically receive product data from the vendor that relates to the content of the web page on which the product data is to be displayed and that is for products of current interest to users of the vendor's web site.

The system can be used in many different environments to provide various types of information appropriate to various types of content. In addition to providing information to requesters who are external to the vendor, the system may also be used internally by a vendor's web site to identify products to advertise on web pages of the web site. For example, when the web site provides a web page describing a product in detail, it may submit to the system the description of the product as content. The system can then identify other products to be advertised on the web page. The content can include any type of textual data. For example, the content can be based on a user's web log ("blog"), an instant messaging message, a chat session, recognized speech, and so on. As described above, the provided information can be data about goods that can be purchased through the vendor's web site or advertisements for services. Alternatively, the information can be used to augment the content. For example, a news organization may want to add links to popular and related news articles to a web page containing a news article. In such a case, the queries may represent queries submitted by users when searching for news articles, and the experience-based relevance techniques would identify the most relevant news articles for each query.

FIG. 1 is a display page illustrating an article of a news organization along with an appropriate advertisement containing product data selected by the system in one embodiment. The display page 100 includes a news article 101 and an advertisement area 104. The news article consists of a headline 102 and a body 103. In this example, the article relates to the theft by a printer of portions of a book that had not yet been released. The news organization may be an associate of a vendor web site that sells books. When the display page is to be displayed to a user, the associate's computer sends a request for an appropriate product to display to the vendor's computer. The request includes content relating to the display page such as the headline or one or more paragraphs of the body. Upon receiving the request, the system executing at the vendor's computer checks its list of queries to identify a query that it determines to be most appropriate for the content. For example, the system may select the query "new Potter book" as the most appropriate based on the total number of times that words of the query are in the content and on the popularity of the query. The system then submits the query to the vendor's product recognizer in much the same way as if the query was submitted by a user of the vendor's web site. The product recognizer determines the identification of a product that recent user experience indicates is most relevant to the query. The system then sends data pertaining to the identified product to the associate's computer for including on the display page. In this example, the data pertains to the book entitled *Harry Potter and the Order of the Phoenix*. Depending on the format of the data, the associate either uses the data as received or reformats the data for display to its users in a manner that is consistent with the overall look and feel of the display page 100.

Figure 2:
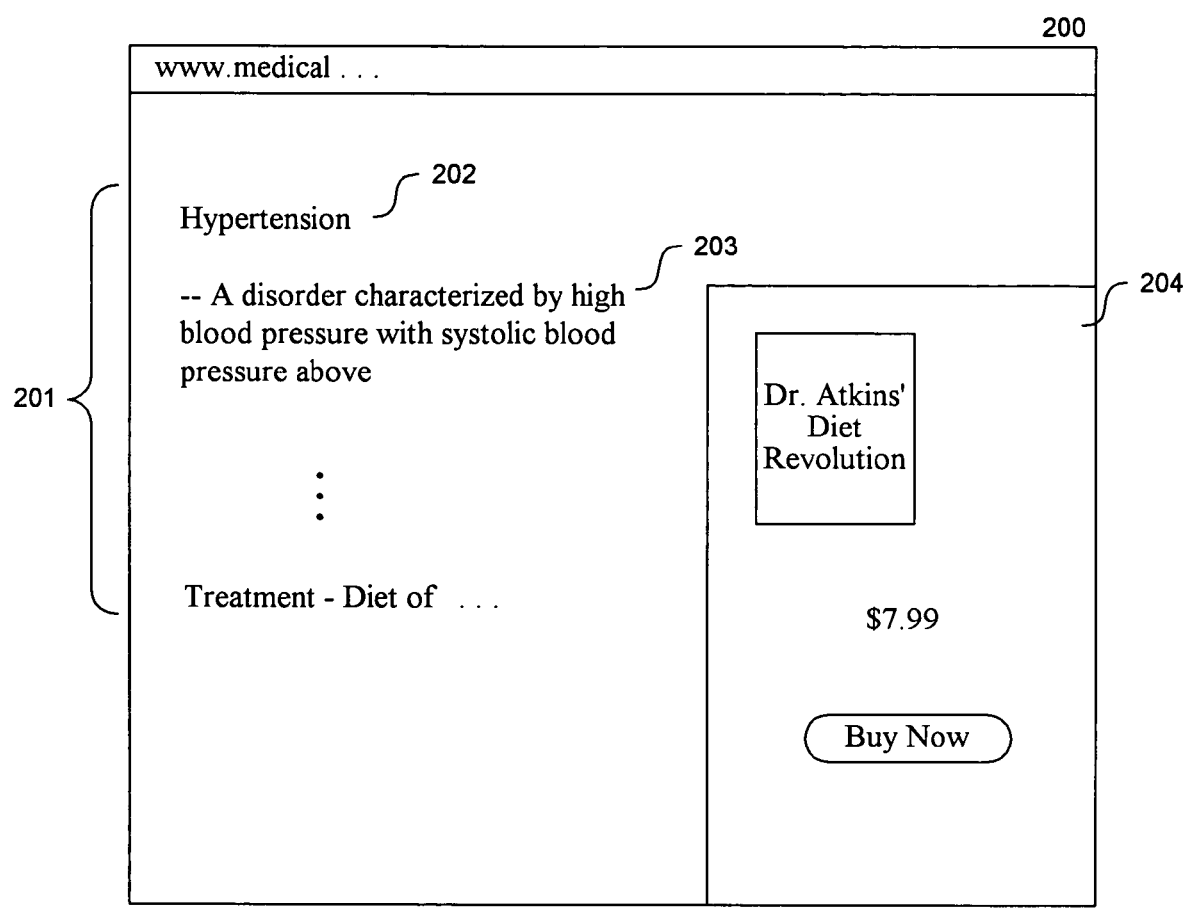
FIG. 2 is a display page illustrating an article on a medical web site along with an appropriate advertisement in one embodiment.

FIG. 2 is a display page illustrating an article on a medical web site along with an appropriate advertisement selected by the system in one embodiment. The display page 200 includes a medical article 201 and an advertisement area 204. The medical article includes a headline 202 and a body 203. In this case, a computer hosting the medical web site sends a request for product data to a vendor's computer. The request included the entire medical article as the content. The system at the vendor's computer identified that the most appropriate query was "Atkins diet." Using the query, the vendor computer identified the book entitled "Dr. Atkins' New Diet Revolution" as the most relevant based on user experiences. An advantage of the system disclosed herein is that it may identify different diet books over time for the same medical article based on the diet books that experience indicates are the most likely to result in a purchase at the time the product data is requested. In contrast, a traditional advertisement server that is not based on popular queries and userexperience-based relevance techniques may identify a book related to hypertension that is relevant to the medical article, but not a book a user is likely to purchase.

Figure 3:
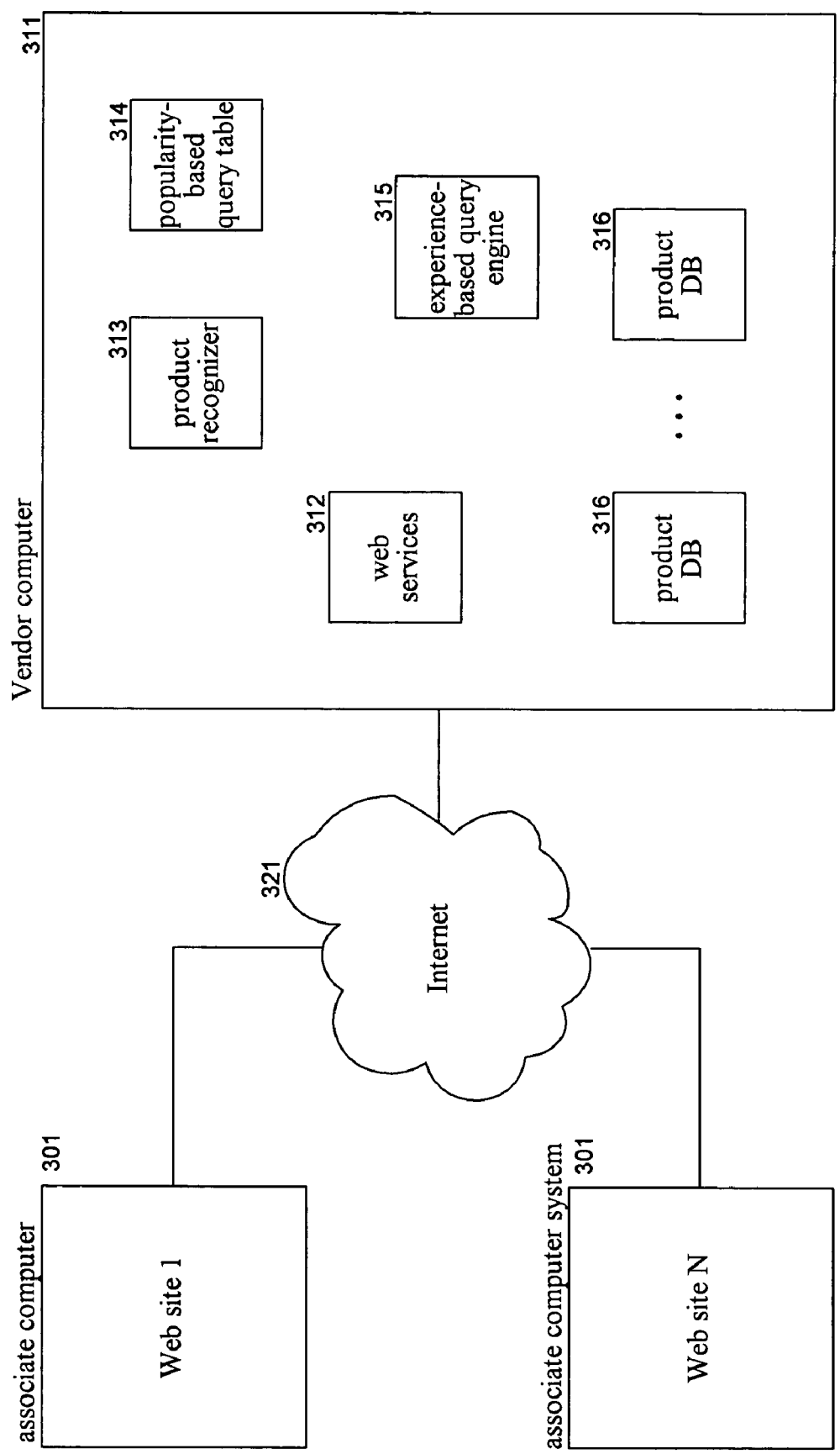
FIG. 3 is a block diagram illustrating components of a vendor computer in one embodiment.

FIG. 3 is a block diagram illustrating components of a vendor computer in one embodiment. The vendor computer 311 is connected via the Internet 321 to various associate computers 301. The vendor computer 311 includes a web services component 312, a product recognizer 313, a popularity-based query table 314, an experience-based query engine 315, and various product databases 316. The web services component 312 receives requests from the associate computers 301 and coordinates the invocation of the various other components to identify information that is appropriate for the content of the request. In one embodiment, the popularity-based query table 314 is a hash table containing queries submitted by users that experience indicates provided results that users found relevant. The results may be deemed relevant if, for example, a user requested more information about, or actually purchased, one of the products identified by the results. Each query may have an indication of its popularity (e.g., number of times users found the results to be relevant). The product recognizer 313 selects a query in the popularity-based query table 314 that is appropriate for the content and then submits that query to the experience-based query engine 315 to identify the most relevant matching products. The experience-based query engine 315 may update the popularity-based query table 314 to reflect further popularity of the query. The experience-based query engine 315 may also be invoked to identify products based on user-submitted queries. When the web services component 312 receives the identification of the products, it retrieves information from the product databases 316 and returns all or a portion of the data in response to the associate computer's request. The vendor computer 311 may have multiple product databases corresponding to different categories of products that the vendor sells. For example, the vendor computer 311 may have a database corresponding to books, another database corresponding to consumer electronics, and another database corresponding to videos.

The computers and servers may include a central processing unit, memory, input devices (e.g., keyboard and pointing devices), output devices (e.g., display devices), and storage devices (e.g., disk drives). The memory and storage devices are computer-readable media that may contain instructions implementing the system. In addition, the data structures and message structures may be stored or transmitted via a data transmission medium, such as a signal on a communications link. Various communications links may be used, such as the Internet, a local area network, a wide area network, or a point-to-point dial-up connection.

Figure 4:
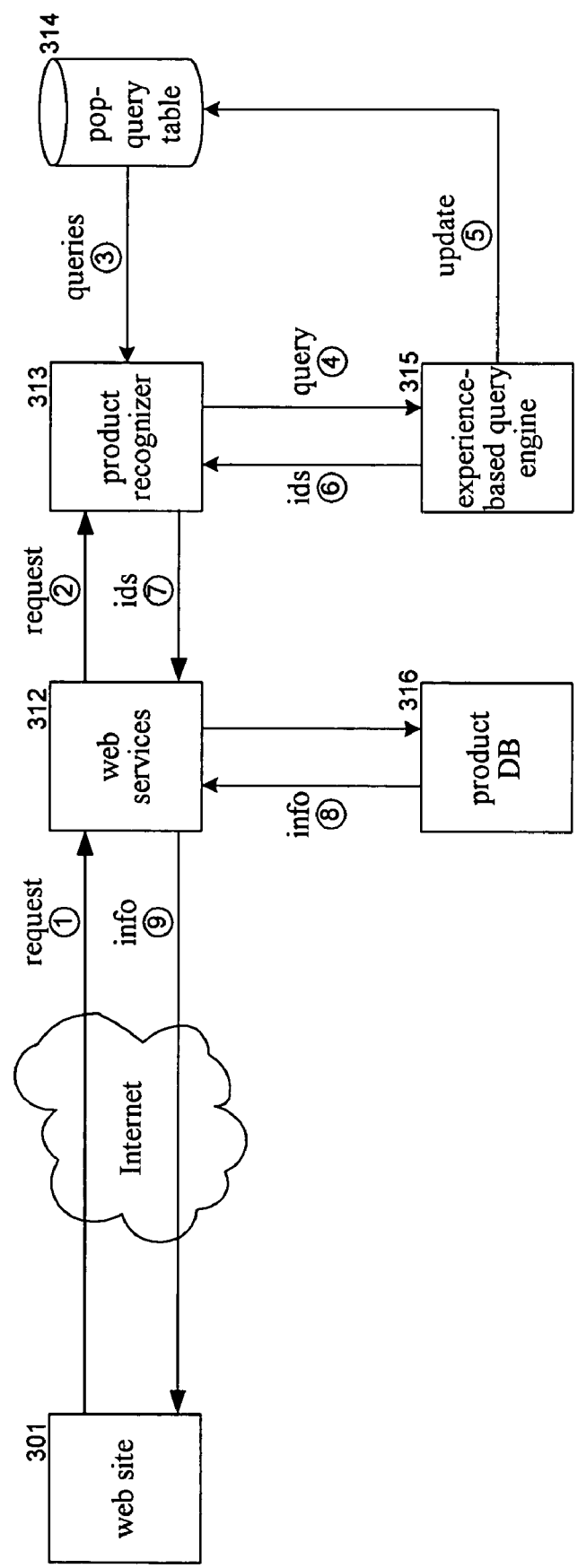
FIG. 4 is a block diagram illustrating the flow of information between an associate computer system and the components of the vendor computer in one embodiment.

FIG. 4 is a block diagram illustrating the flow of information between an associate computer and the components of a vendor computer in one embodiment. The associate computer 301 initiates the process by sending 1 a request to the web services component 312 over the Internet. Upon receiving the request, the web services component forwards 2 the request to the product recognizer 313. The product recognizer compares 3 the content of the request to the queries of the popularity-based query table 314. In one embodiment, the product recognizer, after removing noise words (e.g., "a" and "the") from the content, scans the content to identify phrases (e.g., one or more consecutive words) of the content that correspond to queries in the popularity-based query table. For example, the product recognizer may, starting with the first word of the content, try to find the longest phrase that matches a query. The product recognizer then, starting with the next word after the first longest phrase, tries to find the longest phrase that matches a query, and continues finding longest phrases until the end of the content is reached. If multiple longest phrases match queries, then the product recognizer selects one or more of the queries based on their popularity. The product recognizer then submits 4 the query or queries to the experience-based query engine 315. The experience-based query engine may update 5 the popularity-based query table to reflect that the query has again been submitted. The experience-based query engine then identifies the various products that match each query. The experience-based query engine selects the products user experience indicates is the most relevant to the query and then provides 6 the product identifiers of the selected products to the product recognizer. The product recognizer then provides 7 the product identifier of the mostrelevant product to each query to the web services component. The web services component retrieves 8 information from the product databases 316 for the identified products. The web services component then returns 9 the product data of one or more of the products to the associate computer in response to the initial request 1.

Figure 5:
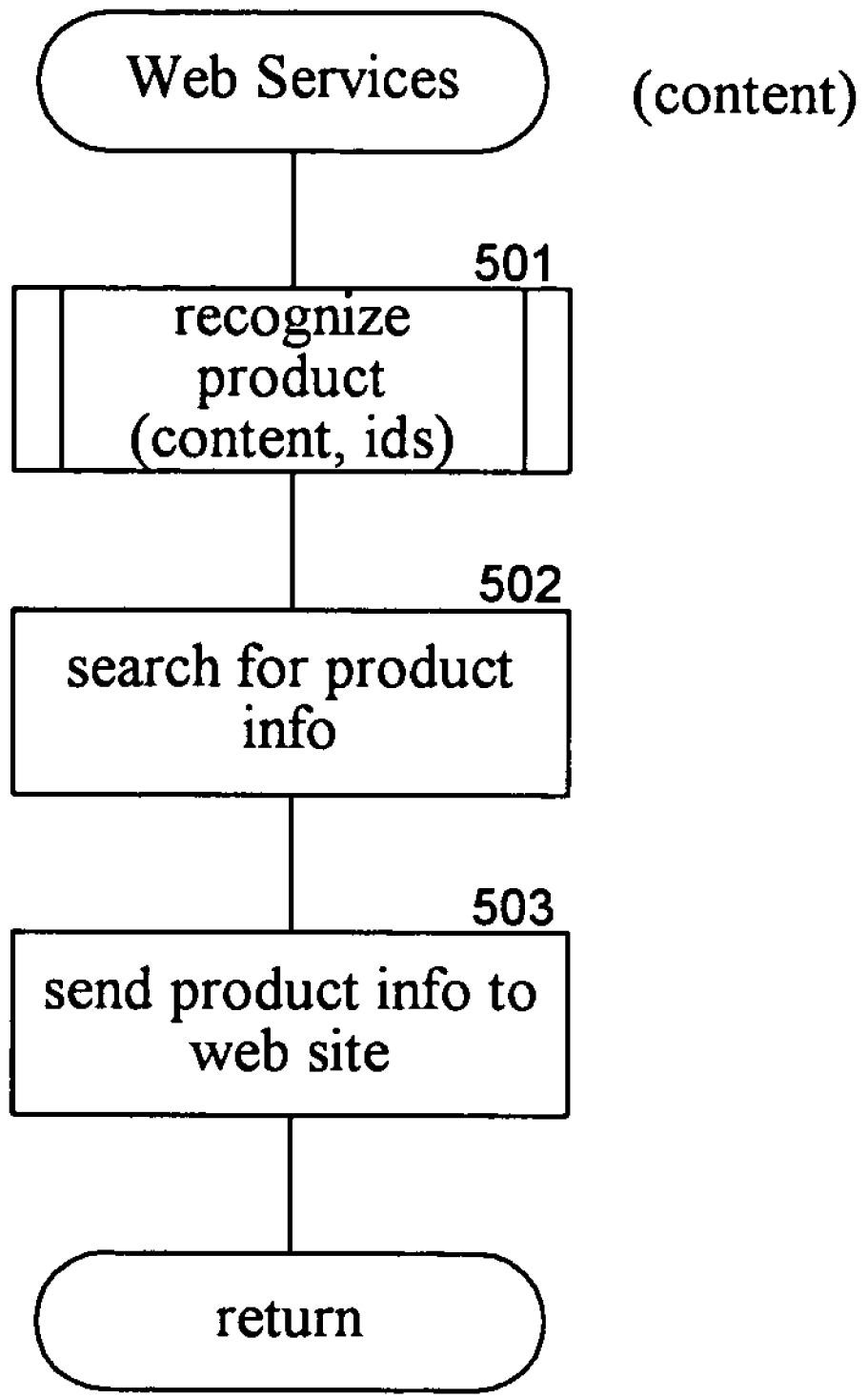
FIG. 5 is a flow diagram illustrating the processing of the web services component in one embodiment.

FIG. 5 is a flow diagram illustrating the processing of the web services component in one embodiment. The component initially receives content from an associate computer 301. In addition to the content, the associate computer may specify the type of information it would like to receive in response to the content, for example, a request to receive "the top three fiction books" pertinent to the content, a single product in any product category pertinent to the content, or "ten kitchen utensils" pertinent to the content. It will be appreciated that the number and type of products requested by the associate computer can vary depending on the intended use of the data. In block 501, the component invokes the product recognizer passing the content and receiving product identifiers in return. In block 502, the component retrieves product data from the product databases for the identified products. The component then formats the product data so that it is responsive to the initial associate computer request. In block 503, the component sends the product data to the associate computer and then completes.

Figure 6:
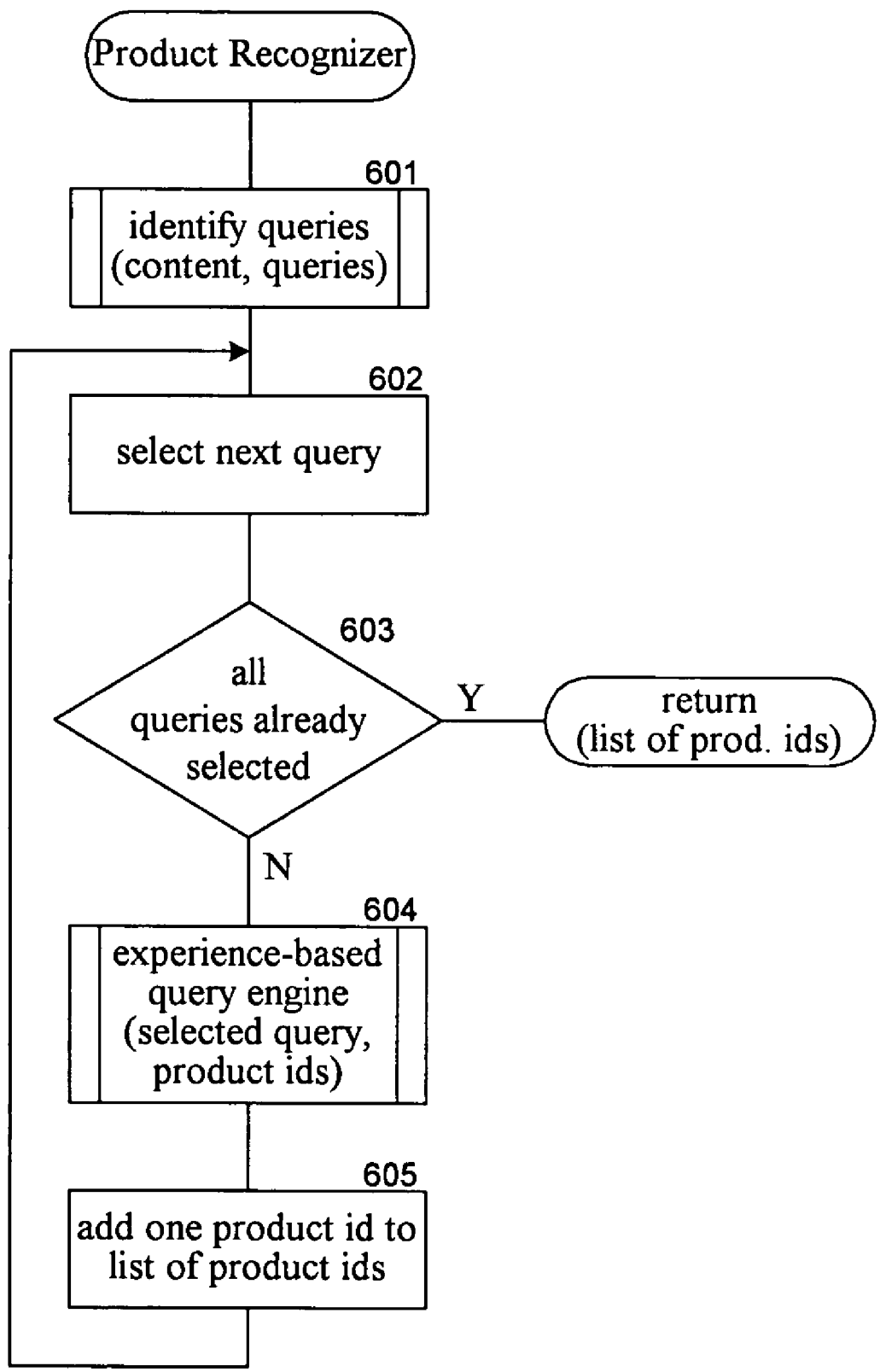
FIG. 6 is a flow diagram illustrating the processing of the product recognizer in one embodiment.

FIG. 6 is a flow diagram illustrating the processing of a product recognizer in one embodiment. In block 601, the product recognizer invokes the identify queries component passing the content and receiving a list of the most popular queries related to the content in return. In blocks 602-605, the product recognizer loops submitting each query to the experience-based query engine. In block 602, the product recognizer selects the next identified query. In decision block 603, if all the identified queries have already been selected, then the product recognizer returns a list of product identifiers, else the product recognizer continues at block 604. In block 604, the product recognizer invokes the experience-based query engine passing the selected query and receiving the product identifiers of the most relevant products in return. In block 605, the product recognizer adds the product identifier of the most relevant product to a list of product identifiers. Alternatively, the product recognizer may add all the received product identifiers or the product identifiers of the "top N" most relevant products to the list. The product recognizer then loops to block 602 to select the next identified query.

Figure 7:
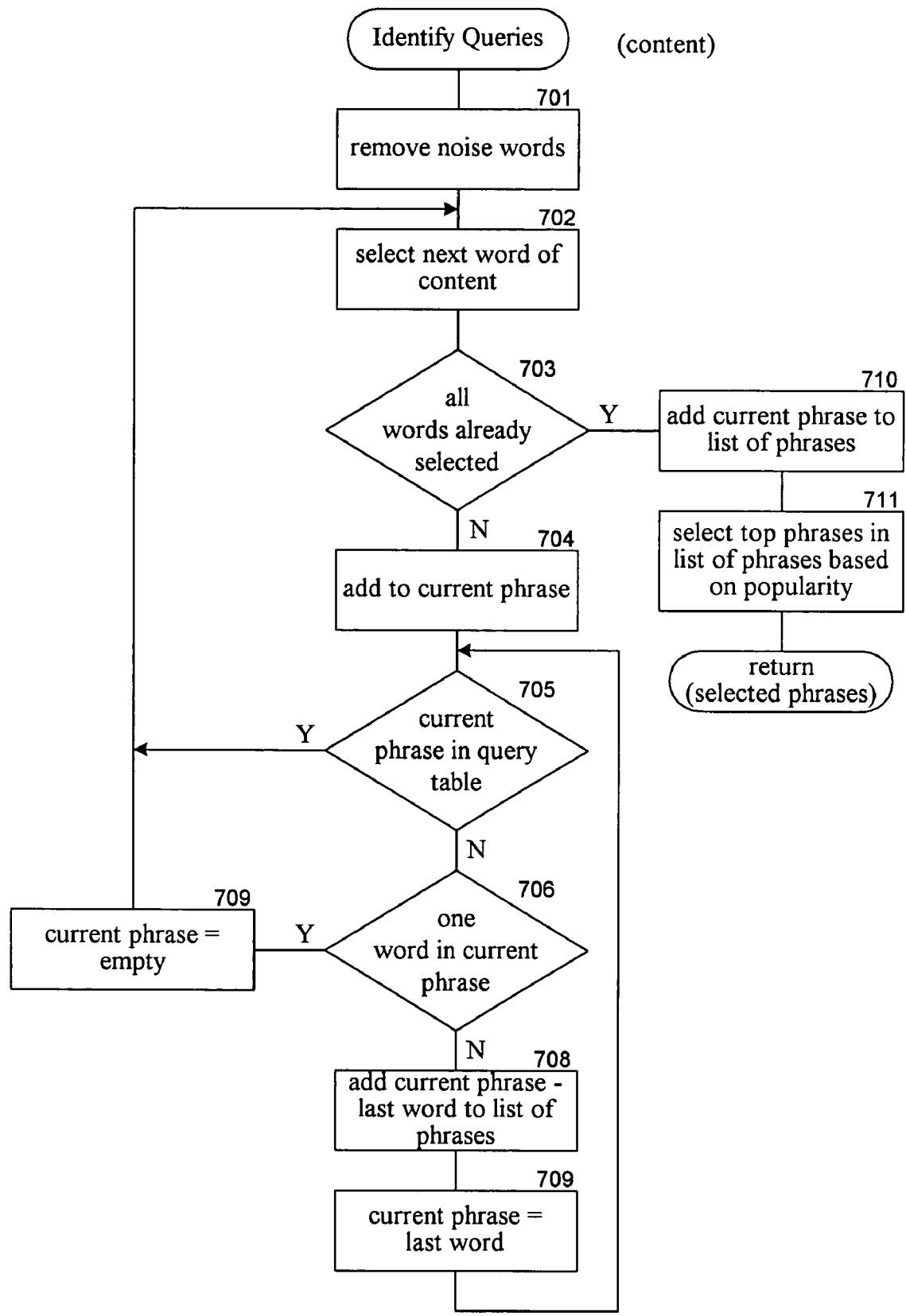
FIG. 7 is a flow diagram illustrating the processing of the identify queries component in one embodiment.

FIG. 7 is a flow diagram illustrating the processing of the identify queries component in one embodiment. The component is passed the content and returns a list of phrases that correspond to the most popular queries appropriate to the content. The component processes the content by identifying the longest phrases that match queries in the popularity-based query table. The component then selects those longest phrases that are most popular to return. In block 701, the component removes noise words (e.g., "a," "and," "the", and "of") from the content. In block 702-709, the component loops identifying the longest phrases. In block 702, the component selects the next word of the content starting with the first word. In decision block 703, if all the words of the content have already been selected, then the component continues at block 710, else the component continues at block 704. In block 704, the component adds the selected word to the current phrase. In decision block 705, if the current phrase is in the query table, then the component loops to block 702 to select the next word to add to the current phrase, else the component continues at block 706. In one embodiment, the component applies a hash function to the current phrase and uses it as an index into a hash table form of the popularity-based query table. One skilled in the art will appreciate that the popularity-based query table may be stored in a variety of different data structures such as a B-tree. In decision block 706, if the current phrase has only one word in it, then the component skips over that word because it is not in the query table as a single-word query and continues at block 707, else the component continues at block 708. In block 707, the component sets the current phrase to empty and loops to block 702 to select the next word of the content to add to the current phrase. In block 708, the component adds the current phrase minus the last word to the list of matching phrases. The last word is removed from the current phrase because the addition of that word resulted in the phrase not matching a query in the query table. In block 709, the component sets the current phrase to the last word of the previous current phrase and then loops to block 705 to determine whether the last word is in the query table. In block 710, the component adds the current phrase to the list of phrases. In block 711, the component selects the top phrases in the list of phrases based on their popularity. For example, the component may select the top three phrases. The component then returns the selected top phrases. If no matching query was found, then the component returns an indication that a match was not found.

Figure 8:
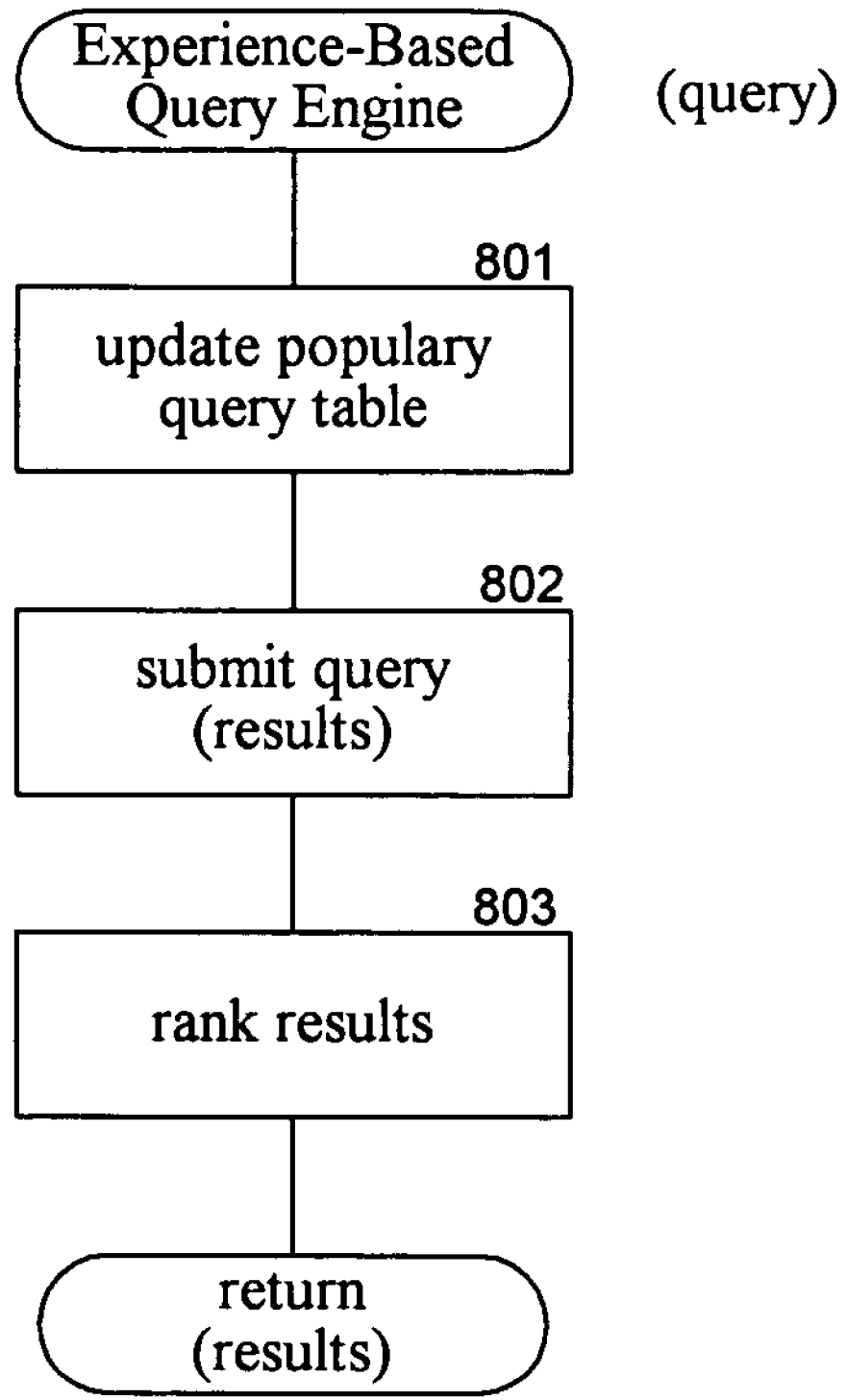
FIG. 8 is a flow diagram illustrating the processing of the experience-based query engine in one embodiment.

FIG. 8 is a flow diagram illustrating the processing of the experience-based query engine in one embodiment. The query engine is passed a query and returns product identifiers that experience indicates are most relevant to the query. In block 801, the component updates the popularity-based query table to reflect that the passed query has again been submitted. This update means the popularity-based query table reflects the combined popularity of user-submitted queries and content-based queries. In block 802, the component submits the passed query to a query search engine and receives matching product identifiers in return. In block 803, the component then ranks the returned product identifiers based on user experience and then returns those identifiers.

One skilled in the art will appreciate that although specific embodiments of the system have been described herein for purposes of illustration, various modifications may be made without deviating from the spirit and scope of the invention. For example, the system may be used to provide information to augment any type of information (e.g., scientific articles, restaurant menus, and catalogs) whether the augmented information is provided by electronic or non-electronic means. As an example, a conventional magazine (e.g., Time or Newsweek) can be augmented to include advertisements for products identified by the system as being appropriate for the subject of the articles. The system can also be used to identify topics of a chat session on products to be advertised during a chat session. (See U.S. patent application Ser. No. 10/279, 088, entitled "Method and System for Conducting a Chat," which is hereby incorporated by reference.) Also, the system may have a separate popularity-based query table for each category of products. For example, the categories may include books, videos, consumer electronics, and so on. In such a case, as described above an associate may specify the category or categories of products of interest when submitting a request to a vendor. Also, one skilled in the art will appreciate that phrases within the content need not exactly match a query to be identified as a match. For example, various techniques may be used to augment the search for matching phrases such as word-stemming and thesaurus-based techniques. The system in one embodiment may also provide a service to associates that is not based on the popularity of queries submitted by users. In such an embodiment, the system may identify a query using conventional techniques and submit the query to an experience-based query engine to identify products that, based on user experience, may be relevant to the query. The system may select a query previously submitted by a user as the identified query. Accordingly, the invention is defined by the appended claims.

We claim:

1. A computer-based method performed in a computer system for identifying a product relating to a web page configured to be displayed through a first web site, the method comprising:

storing in the computer system a plurality of previously submitted queries submitted through a second web site by users of the second web site, said second website associated with a vendor that offers products for consumption, each of the previously submitted queries having a popularity value stored in the computer system;

receiving at the computer system a request for product information from an associate of the vendor, said request including content derived from the web page;

identifying at the computer system previously submitted queries that match at least a portion of the content derived from the web page, the identified previously submitted queries from the plurality of previously submitted queries;

selecting at the computer system an identified previously submitted query based at least in part on the popularity value of the identified previously submitted query;

submitting from the computer system the selected previously submitted query to a product search engine to identify a product, based at least in part on experience-based relevance of the product to the selected previously submitted query, said experience-based relevance based at least in part on interactions of users with results of queries similar to the selected previously submitted query, that is related to the content; and providing from the computer system information about the identified product to be displayed on the web page through the first web site.

2. The method of claim 1 including selecting product data for the identified product.

3. The method of claim 1 wherein the content is an article of the web page.

4. The method of claim 1 wherein the content is a headline of the web page.

5. The method of claim 1 wherein the web page represents a web log.

6. The method of claim 1 wherein the web page contains an instant messaging message.

7. The method of claim 1 wherein the content is derived from information provided by an associate of a vendor web site that sells products.

8. The method of claim 7 wherein the associate is compensated based at least in part on a user purchase of the identified product.

9. A computer-based method performed in a computer system for providing information about a product to be associated with content from a first system, the method comprising:

storing in the computer system a plurality of previously-submitted queries submitted to a second system, said second system associated with an associate vendor, each previously submitted query having a popularity of submission value stored in the computer system;

receiving at the computer system a request for product information, said request including content information derived from the content;

identifying at the computer system, based at least in part on the content information, a previously submitted query from the plurality of previously submitted queries based at least in part on a relevance of the previously submitted query to the content and the popularity of submission value of the previously submitted query;

submitting from the computer system the identified previously submitted query to select a product, based at least in part on experience-based relevance of the product to the identified previously submitted query, said experience-based relevance based at least in part on interactions of users with results of queries similar to the identified previously submitted query, that matches the identified previously submitted query as the product to be associated with the content; and providing from the computer system information about the selected product to be associated with the content through the first system.

10. The method of claim 9 wherein the relevance of the previously submitted query to the content is based at least in part on matching phrases in the content to the previously submitted query.

11. The method of claim 9 wherein identifying the previously submitted query involves selecting a relevant previously submitted query that is most popular.

12. The method of claim 9 wherein the selecting of a product includes:
  identifying products that match the identified previously submitted query;
  ranking the identified products based at least in part on the experience of users who accessed results of similar queries; and
  selecting a high-ranking product as the product that matches the identified previously submitted query.

13. The method of claim 9 wherein the content is related to an article.

14. The method of claim 13 wherein the content is a headline of the article.

15. The method of claim 13 wherein the content is a body of the article.

16. The method of claim 13 wherein the content is a portion of a body of the article.

17. The method of claim 9 wherein the content is a web log.

18. The method of claim 9 wherein the content is an instant messaging message.

19. The method of claim 9 wherein the content is a portion of a dynamically generated web page.

20. The method of claim 9 wherein the content is provided by an associate of a vendor web site that sells products.

21. The method of claim 20 including providing to the associate an advertisement for the selected product.

22. The method of claim 21 wherein the associate is compensated based at least in part on a user purchase of the selected product.

23. A method in a computer system for providing information relating to content of a first web page, the method comprising:
  receiving a request to view the content from a visitor of the first web page;
  sending at least a portion of the content to a web service associated with a vendor that offers products for consumption, the web service for storing a plurality of previously submitted queries, for identifying, based at least in part on a popularity value stored for the plurality of previously submitted queries, a previously submitted query from the plurality of previously submitted queries that is related to the sent content, and for selecting a product of said products, based at least in part on experience-based relevance of the product to the identified previously submitted query, said experience-based relevance based at least in part on interactions of users with results of queries similar to the identified previously submitted query, that matches the identified previously submitted query as the product to be associated with the content;
  receiving information relating to the product associated with the content; and
  concurrently displaying the content and the received information to the visitor of the first web page.

24. The method of claim 23 wherein the identifying of a previously submitted query is based at least in part on popularity of the query.

25. The method of claim 23 wherein the received information is product data.

26. The method of claim 23 wherein the received information is an advertisement.

27. The method of claim 23 wherein the web service is provided by a vendor and the content is provided by an associate of the vendor.

28. A computer system for providing product information relating to content, comprising:
  a popularity-based query table containing previously submitted queries submitted by users of the computer system and indications of the popularity of the queries among users, said computer system associated with a vendor that offers products for consumption;
  a component that identifies previously submitted queries of the popularity-based query table that match at least a portion of content in a request for product information, said request received from a source external to the computer system, the external source configured to display the content to users visiting the external source;
  a component that selects an identified previously submitted query based at least in part on its indication of popularity as indicated by the popularity-based query table; and
  a component that, in response to said request and based at least in part on experience-based relevance of the product to the selected identified previously submitted query, said experience-based relevance based at least in part on interactions of users with results of queries similar to the selected identified previously submitted query, provides information about a product corresponding to the selected identified previously submitted query, to be displayed with the content through the external source.

29. The computer system of claim 28 including a component that submits the selected identified previously submitted query to a query engine to identify information relating to the content.

30. The computer system of claim 29 wherein the query engine is experience-based.

31. The computer system of claim 29 wherein the information is product data.

32. The computer system of claim 28 wherein the content is received from an associate of the vendor's web site.

33. The computer system of claim 28 wherein the identifying of previously submitted queries includes identifying the longest phrases of the content that match a query.

34. The computer system of claim 28 wherein the popularity of a query is based at least in part on when users purchase the product identified by results of the query.

35. The computer system of claim 28 wherein the popularity of a query is based at least in part on when users request information on a product identified by results of the query.

36. The computer system of claim 28 wherein the previously submitted queries have been submitted by users of a web site associated with the computer system.

37. A computer-readable storage medium containing instructions for controlling a computer system to provide product data by a method comprising:
  generating at the computer system to generate a popularity-based query table containing previously submitted queries submitted by users of a vendor's web site and indications of the popularity of the queries among the users;

receiving at the computer system content to be displayed on an associate's web site, the associate's web site configured to concurrently display product data provided by the vendor and the content;

identifying at the computer system previously submitted queries of the popularity-based query table that match the received content;

selecting at the computer system an identified previously submitted query based at least in part on its indication of popularity as indicated by the popularity-based query table;

submitting from the computer system the selected identified previously submitted query to identify products, based at least in part on experience-based relevance of the products to the selected identified previously submitted query, said experience-based relevance based at least in part on interactions of users with results of queries similar to the selected identified previously submitted query, that match the selected identified previously submitted query;

retrieving to the computer system product data associated with an identified product; and sending from the computer system the retrieved product data to be displayed with the content on the associate's web site.

38. The computer-readable storage medium of claim 37 wherein the submitting of the selected identified previously submitted query is performed by an experience-based query engine.

39. The computer-readable storage medium of claim 37 wherein the identifying of previously submitted queries includes identifying the longest phrases of the received content that match a query.

40. The computer-readable storage medium of claim 37 wherein the popularity of a query is based at least in part on when users purchase a product identified by results of the query.

41. The computer-readable storage medium of claim 37 wherein the popularity of a query is based at least in part on when users request information on a product identified by results of the query.

42. The computer-readable storage medium of claim 37 wherein the products are offered for sale by the vendor.

43. The computer-readable storage medium of claim 37 wherein the content is derived from a web page to be served by the associate.

44. The computer-readable storage medium of claim 43 wherein the associate is compensated by the vendor when a user to whom the web page is served purchases the product from the vendor.

45. A computer system for identifying products related to content, comprising:

means for providing a popularity-based query table containing previously submitted queries and indications of the popularity of each of the previously submitted queries;

means for receiving a request to identify products related to content, said request from an external source associated with a vendor that offers said products for consumption;

means for selecting a previously submitted query from the popularity-based query table based at least in part on the indication of popularity of the selected previously submitted query and the received content;

means for identifying products, based at least in part on experience-based relevance of the products to the selected previously submitted query, said experience-based relevance based at least in part on interactions of users with results of queries similar to the selected previously submitted query, that match the selected previously submitted query; and means for providing information about the identified products to the external source to be displayed concurrently with the content in response to receiving the request.

46. A method in a computer system of a vendor for providing product data relating to content provided by an associate of the vendor, the method comprising:

storing at the computer system of the vendor a plurality of previously submitted queries received by the computer system of the vendor, the queries received by users of the computer system of the vendor;

receiving at the computer system of the vendor a request from the associate for product data for a product relating to content transmitted to users by a computer system of the associate;

identifying at the computer system of the vendor a previously submitted query among the plurality of previously submitted queries that matches the content;

executing at the computer system of the vendor the identified previously submitted query to identify, based at least in part on experience-based relevance of the products to the identified previously submitted query, said experience-based relevance based at least in part on interactions of users with results of queries similar to the identified previously submitted query, a product that matches the identified previously submitted query;

retrieving to the computer system of the vendor product data relating to the product that matches the identified previously submitted query; and sending from the computer system of the vendor to the computer system of the associate the retrieved product data.

47. The method of claim 46 wherein the identified previously submitted query is identified based at least in part on the popularity of previously submitted queries among users.

48. The method of claim 46 wherein the identified previously submitted query is not identified based on the popularity of previously submitted queries among users.

49. The method of claim 46 wherein the method is provided as a web service of the vendor.

50. The method of claim 46 wherein the product data is an advertisement for a product sold by the vendor.

* * * * *